US008909962B2

(12) United States Patent
Thomson et al.

(10) Patent No.: US 8,909,962 B2
(45) Date of Patent: Dec. 9, 2014

(54) SYSTEM AND METHOD FOR CONTROLLING CENTRAL PROCESSING UNIT POWER WITH GUARANTEED TRANSIENT DEADLINES

(75) Inventors: Steven S. Thomson, San Diego, CA (US); Bohuslav Rychlik, San Diego, CA (US); Ali Iranli, San Diego, CA (US); Sumit Sur, Boulder, CO (US); Norman S. Gargash, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 12/944,467

(22) Filed: Nov. 11, 2010

(65) Prior Publication Data

US 2011/0145617 A1 Jun. 16, 2011

Related U.S. Application Data

(60) Provisional application No. 61/286,991, filed on Dec. 16, 2009.

(51) Int. Cl.
*G06F 1/00* (2006.01)
*G06F 1/32* (2006.01)

(52) U.S. Cl.
CPC .............. *G06F 1/3203* (2013.01); *G06F 1/324* (2013.01); *G06F 1/3296* (2013.01); *Y02B 60/1217* (2013.01); *Y02B 60/1285* (2013.01)
USPC ........................................................ 713/323

(58) Field of Classification Search
None
See application file for complete search history.

(56) References Cited

U.S. PATENT DOCUMENTS

| 4,601,008 A | 7/1986 | Kato |
| 5,644,769 A | 7/1997 | Hasiguti |
| 6,073,244 A | 6/2000 | Iwazaki |
| 6,076,171 A | 6/2000 | Kawata |
| 6,804,632 B2 | 10/2004 | Orenstien et al. |
| 6,829,713 B2 | 12/2004 | Cooper et al. |
| 6,978,389 B2 | 12/2005 | Jahnke |
| 7,043,405 B2 | 5/2006 | Orenstien et al. |
| 7,058,824 B2 | 6/2006 | Plante et al. |

(Continued)

FOREIGN PATENT DOCUMENTS

| CN | 1692326 A | 11/2005 |
| CN | 101076770 A | 11/2007 |

(Continued)

OTHER PUBLICATIONS

Semeraro et al., "Energy-Efficient Processor Design Using Multiple Clock Domains with Dynamic Voltage and Frequency Scaling," International Symposium on High-Performance Computer Architecture, pp. 0029, Eighth International Symposium on High-Performance Computer architecture (HPCA'02), 2002, Boston, Massachusetts. ISBN: 0-7695-1525-8.

(Continued)

*Primary Examiner* — Jaweed A Abbaszadeh
*Assistant Examiner* — Austin Hicks
(74) *Attorney, Agent, or Firm* — Nicholas A. Cole

(57) ABSTRACT

A method of controlling power at a central processing unit is disclosed. The method may include moving to a higher CPU frequency after a transient performance deadline has expired, entering an idle state, and resetting the transient performance deadline based on an effective transient budget.

40 Claims, 9 Drawing Sheets

(56) References Cited

U.S. PATENT DOCUMENTS

| | | |
|---|---|---|
| 7,107,187 B1 * | 9/2006 | Saghier et al. ............... 702/186 |
| 7,133,806 B2 | 11/2006 | Prasad |
| 7,134,031 B2 | 11/2006 | Flautner |
| 7,219,245 B1 | 5/2007 | Raghuvanshi |
| 7,233,188 B1 | 6/2007 | Takano et al. |
| 7,263,457 B2 | 8/2007 | White et al. |
| 7,346,787 B2 | 3/2008 | Vaidya et al. |
| 7,369,967 B1 * | 5/2008 | Washburn et al. ............ 702/186 |
| 7,370,189 B2 | 5/2008 | Fischer et al. |
| 7,398,407 B2 | 7/2008 | Jorgenson et al. |
| 7,401,240 B2 | 7/2008 | Heller, Jr. et al. |
| 7,437,581 B2 | 10/2008 | Grochowski et al. |
| 7,467,291 B1 * | 12/2008 | Cockroft et al. ................. 713/1 |
| 7,500,124 B2 | 3/2009 | Seo |
| 7,543,161 B2 | 6/2009 | Olszewski et al. |
| 7,650,527 B2 | 1/2010 | Rambo et al. |
| 7,669,067 B2 | 2/2010 | Degenhardt |
| 7,689,838 B2 | 3/2010 | Srinivasan et al. |
| 7,711,966 B2 | 5/2010 | Prabhakaran et al. |
| 7,761,874 B2 | 7/2010 | Bodas |
| 7,783,906 B2 | 8/2010 | Turner et al. |
| 7,849,349 B2 | 12/2010 | Tamlyn |
| 7,949,887 B2 | 5/2011 | Gunther et al. |
| 2002/0046354 A1 | 4/2002 | Ostrom et al. |
| 2002/0188877 A1 | 12/2002 | Buch |
| 2003/0115495 A1 | 6/2003 | Rawson, III |
| 2003/0177163 A1 | 9/2003 | Nomura |
| 2004/0225902 A1 | 11/2004 | Cesare et al. |
| 2004/0254765 A1 | 12/2004 | Lee et al. |
| 2005/0102560 A1 | 5/2005 | Taketoshi et al. |
| 2006/0036878 A1 | 2/2006 | Rothman et al. |
| 2006/0123253 A1 | 6/2006 | Morgan et al. |
| 2006/0149975 A1 | 7/2006 | Rotem et al. |
| 2007/0016815 A1 | 1/2007 | Cooper et al. |
| 2007/0033425 A1 | 2/2007 | Clark |
| 2007/0033526 A1 | 2/2007 | Thompson et al. |
| 2007/0255929 A1 | 11/2007 | Kasahara et al. |
| 2008/0005591 A1 | 1/2008 | Trautman et al. |
| 2008/0028244 A1 | 1/2008 | Capps et al. |
| 2008/0162965 A1 | 7/2008 | Marinas et al. |
| 2008/0168287 A1 | 7/2008 | Berry et al. |
| 2008/0201591 A1 | 8/2008 | Hu et al. |
| 2008/0310099 A1 | 12/2008 | Monferrer et al. |
| 2009/0037922 A1 * | 2/2009 | Herington ..................... 718/104 |
| 2009/0049314 A1 * | 2/2009 | Taha et al. ..................... 713/300 |
| 2009/0106576 A1 | 4/2009 | Jacobowitz et al. |
| 2009/0150695 A1 | 6/2009 | Song et al. |
| 2009/0150696 A1 | 6/2009 | Song et al. |
| 2009/0187775 A1 | 7/2009 | Ishikawa |
| 2009/0217276 A1 | 8/2009 | Brenner et al. |
| 2009/0230930 A1 | 9/2009 | Jain et al. |
| 2009/0249347 A1 | 10/2009 | Henmi |
| 2009/0271646 A1 | 10/2009 | Talwar et al. |
| 2009/0276642 A1 | 11/2009 | Burton et al. |
| 2010/0076733 A1 * | 3/2010 | Kumar et al. ..................... 703/2 |
| 2010/0122101 A1 | 5/2010 | Naffziger et al. |
| 2011/0023047 A1 | 1/2011 | Memik et al. |
| 2011/0145559 A1 | 6/2011 | Thomson et al. |
| 2011/0145605 A1 | 6/2011 | Sur et al. |
| 2011/0145615 A1 | 6/2011 | Rychlik et al. |
| 2011/0145616 A1 | 6/2011 | Rychlik et al. |
| 2011/0145624 A1 | 6/2011 | Rychlik et al. |
| 2011/0145824 A1 | 6/2011 | Thomson et al. |
| 2013/0074085 A1 | 3/2013 | Thomson et al. |
| 2013/0151879 A1 | 6/2013 | Thomson |
| 2014/0181542 A1 | 6/2014 | Sur et al. |

FOREIGN PATENT DOCUMENTS

| | | |
|---|---|---|
| CN | 101111814 A | 1/2008 |
| CN | 101135928 A | 3/2008 |
| CN | 101211215 A | 7/2008 |
| CN | 101241390 A | 8/2008 |
| CN | 101351759 A | 1/2009 |
| CN | 101403944 A | 4/2009 |
| CN | 101414268 A | 4/2009 |
| CN | 101436098 A | 5/2009 |
| EP | 0098169 A2 | 1/1984 |
| EP | 0942363 A2 | 9/1999 |
| EP | 1496424 A2 | 1/2005 |
| GB | 2445167 A | 7/2008 |
| JP | H0351902 A | 3/1991 |
| JP | 8006681 A | 1/1996 |
| JP | H08190535 A | 7/1996 |
| JP | H10268963 A | 10/1998 |
| JP | H11282695 A | 10/1999 |
| JP | 2002099433 A | 4/2002 |
| JP | 2004533674 A | 11/2004 |
| JP | 2005128937 A | 5/2005 |
| JP | 2006011548 A | 1/2006 |
| JP | 2008059054 A | 3/2008 |
| JP | 2008117397 A | 5/2008 |
| JP | 2008513912 A | 5/2008 |
| JP | 2008129846 A | 6/2008 |
| JP | 2008165798 A | 7/2008 |
| JP | 2008269249 A | 11/2008 |
| JP | 2009503728 A | 1/2009 |
| JP | 2009037335 A | 2/2009 |
| JP | 2009140157 A | 6/2009 |
| JP | 2009169858 A | 7/2009 |
| JP | 2009238024 A | 10/2009 |
| JP | 2010518525 A | 5/2010 |
| KR | 20070049226 A | 5/2007 |
| KR | 20090107490 A | 10/2009 |
| TW | 200907660 A | 2/2009 |
| WO | WO0225414 A2 | 3/2002 |
| WO | WO-02074046 A2 | 9/2002 |
| WO | WO-2004044720 A2 | 5/2004 |
| WO | WO2005119412 A1 | 12/2005 |
| WO | 2006037119 A2 | 4/2006 |
| WO | 2007007300 A2 | 1/2007 |
| WO | WO-2007019003 A2 | 2/2007 |
| WO | 2008047179 A1 | 4/2008 |

OTHER PUBLICATIONS

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

International Search Report and Written Opinion—PCT/US2010/058075—ISA/EPO—Apr. 27, 2011.

International Search Report and Written Opinion—PCT/US2010/059535, ISA/EPO—Apr. 28, 2011.

International Search Report and Written Opinion—PCT/US2010/059560—ISA/EPO—Jun. 15, 2011.

International Search Report and Written Opinion—PCT/US2010/059562, ISA/EPO—May 27, 2011.

International Search Report and Written Opinion—PCT/US2010/059538, International Search Authority—European Patent Office—Apr. 7, 2011.

Compaq et al, "Advanced Configuration and Power Interface Specification", Compaq Computer Corporation, Intel Cor0poration, Microsoft Corporation, Phoenix Technologies Ltd., Toshiba Corporation, Revision 2.0, Jul. 27, 2000.

iDebian, CPU frequency scaling in Linux, Jun. 26, 2008, iDebian's Weblog.

Stallings, W., "Operating systems internals and design principles," 2005, Pearson, 5th edition, section 3.2, pp. 111-126.

Kanai J, et al., "Statistical Prediction-based Energy-Aware Linux Scheduler for CMP systems", Proceedings of computer system symposium (IPSJ symposium series), vol. 2008, No. 12, Information Processing Society of Japan, Nov. 5, 2008, pp. 77-86.

Kondo M., et al., "Dynamic Processor Throttling for Low Power Computing", IPSJ Transactions on Advanced Computing Systems, Information Processing Society of Japan, May 15, 2004, vol. 45 No. SIG6 (ACS6), pp. 1-11.

* cited by examiner

SYSTEM AND METHOD FOR CONTROLLING CENTRAL PROCESSING UNIT POWER WITH GUARANTEED TRANSIENT DEADLINES

RELATED APPLICATIONS

The present application claims priority to U.S. Provisional Patent Application Ser. No. 61/286,991, entitled SYSTEM AND METHOD OF DYNAMICALLY CONTROLLING POWER IN A CENTRAL PROCESSING UNIT, filed on Dec. 16, 2009, the contents of which are fully incorporated by reference.

CROSS-REFERENCED APPLICATIONS

The present application is related to, and incorporates by reference, U.S. patent application Ser. No. 12/944,140, entitled SYSTEM AND METHOD FOR CONTROLLING CENTRAL PROCESSING UNIT POWER BASED ON INFERRED WORKLOAD PARALLELISM, by Rychlik et al., filed concurrently. The present application is related to, and incorporates by reference, U.S. patent application Ser. No. 12/944,202, entitled SYSTEM AND METHOD FOR CONTROLLING CENTRAL PROCESSING UNIT POWER IN A VIRTUALIZED SYSTEM, by Rychlik et al., filed concurrently. The present application is related to, and incorporates by reference, U.S. patent application Ser. No. 12/944,321, entitled SYSTEM AND METHOD FOR ASYNCHRONOUSLY AND INDEPENDENTLY CONTROLLING CORE CLOCKS IN A MULTICORE CENTRAL PROCESSING UNIT, by Rychlik et al., filed concurrently. The present application is related to, and incorporates by reference, U.S. patent application Ser. No. 12/944,378, entitled SYSTEM AND METHOD FOR CONTROLLING CENTRAL PROCESSING UNIT POWER WITH REDUCED FREQUENCY OSCILLATIONS, by Thomson et al., filed concurrently. The present application is related to, and incorporates by reference, U.S. patent application Ser. No. 12/944,561, entitled SYSTEM AND METHOD FOR CONTROLLING CENTRAL PROCESSING UNIT POWER WITH GUARANTEED STEADY STATE DEADLINES, by Thomson et al., filed concurrently. The present application is related to, and incorporates by reference, U.S. patent application Ser. No. 12/944,564, entitled SYSTEM AND METHOD FOR DYNAMICALLY CONTROLLING A PLURALITY OF CORES IN A MULTICORE CENTRAL PROCESSING UNIT BASED ON TEMPERATURE, by Sur et al., filed concurrently.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the computing or processing power required to support such functionality also increases. Further, as the computing power increases, there exists a greater need to effectively manage the processor, or processors, that provide the computing power.

Accordingly, what is needed is an improved method of controlling power within a multicore CPU.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
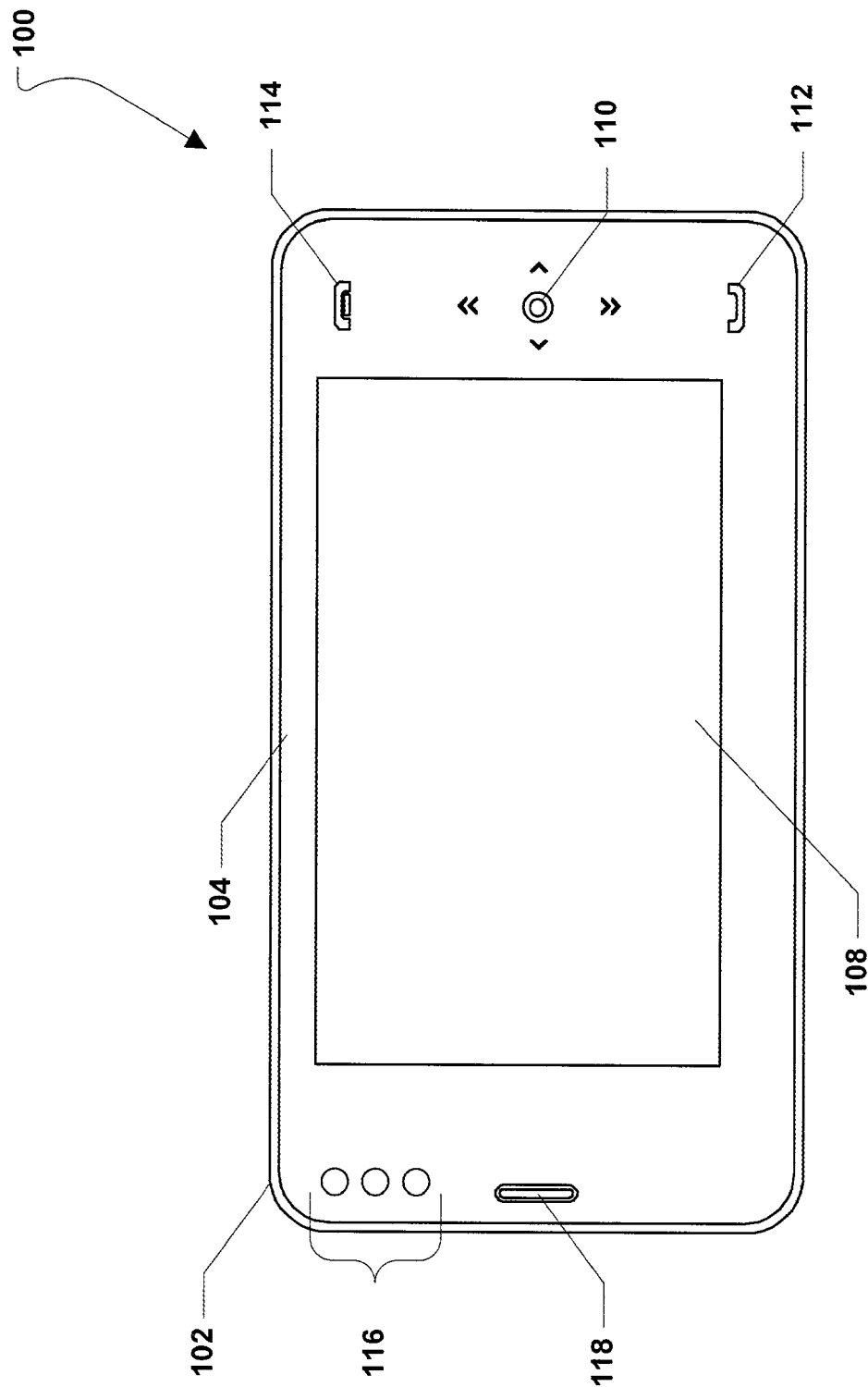
FIG. 1 is a front plan view of a first aspect of a portable computing device (PCD) in a closed position.
Figure 2:
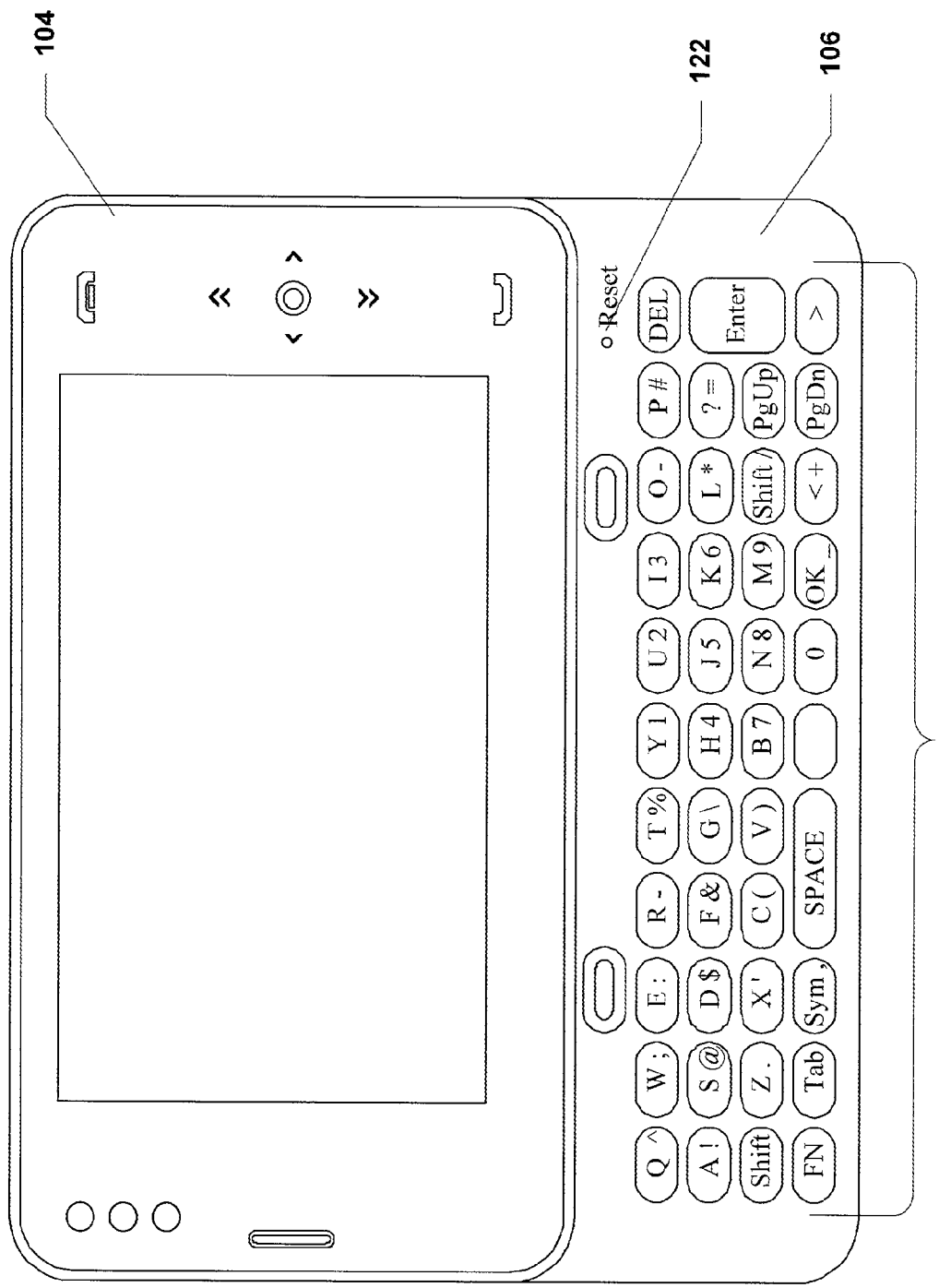
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
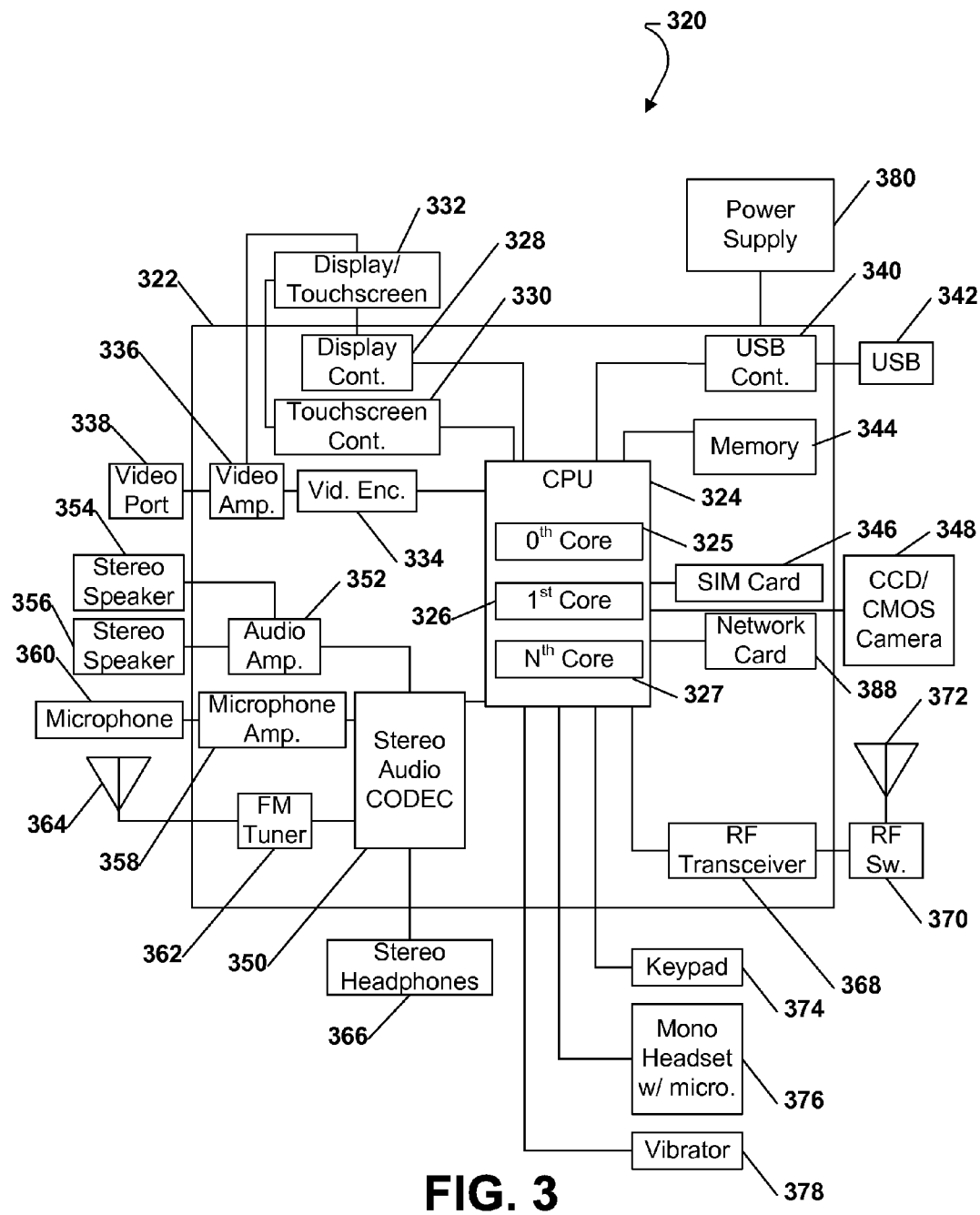
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a touch screen display display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to a dynamically control the power of each CPU, or core, within the multicore CPU 324.

Figure 4:
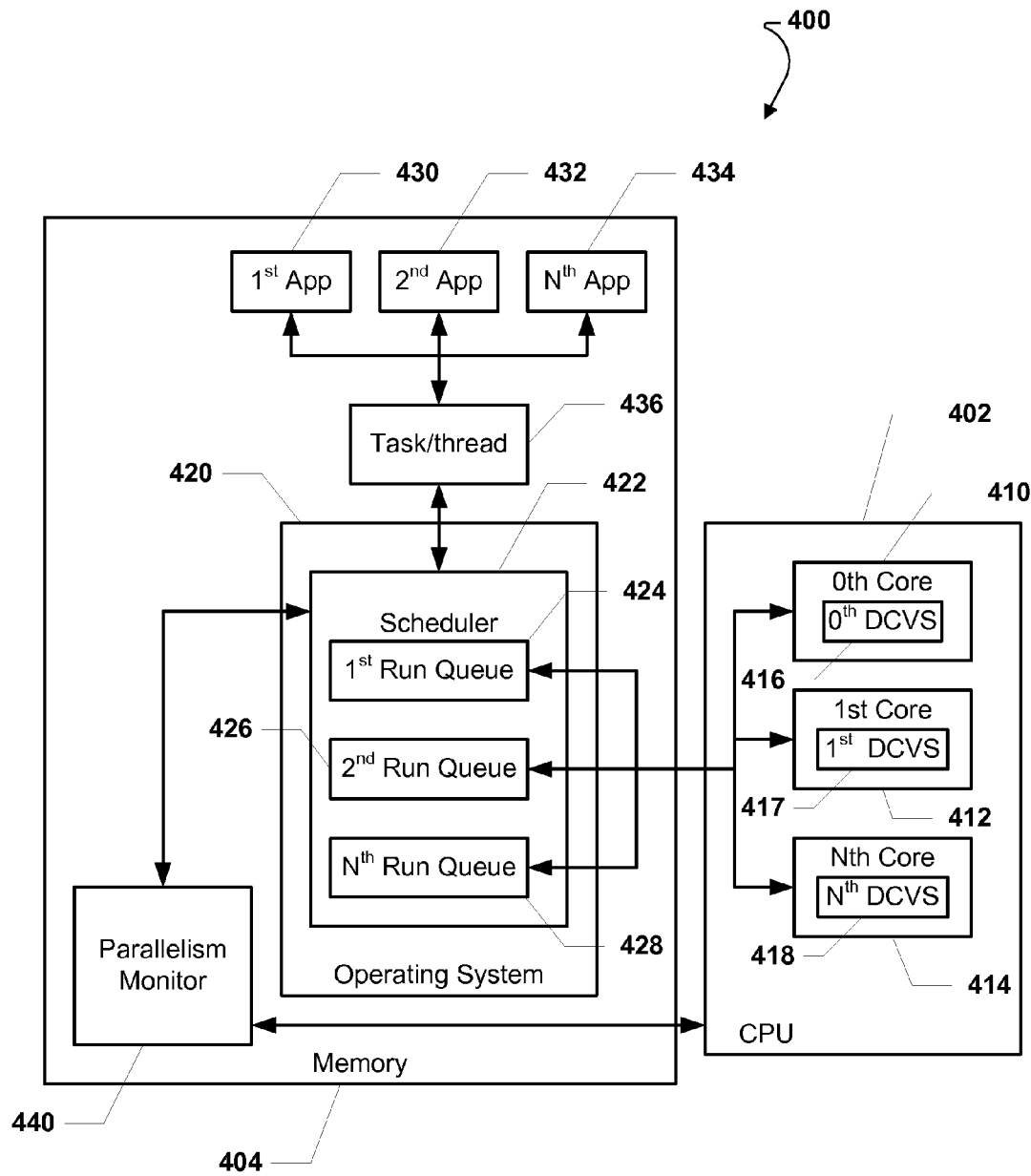
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a parallelism monitor 440 stored thereon. The parallelism monitor 440 may be connected to the operating system 420 and the multicore CPU 402. Specifically, the parallelism monitor 440 may be connected to the scheduler 422 within the operating system 420.

Figure 5:
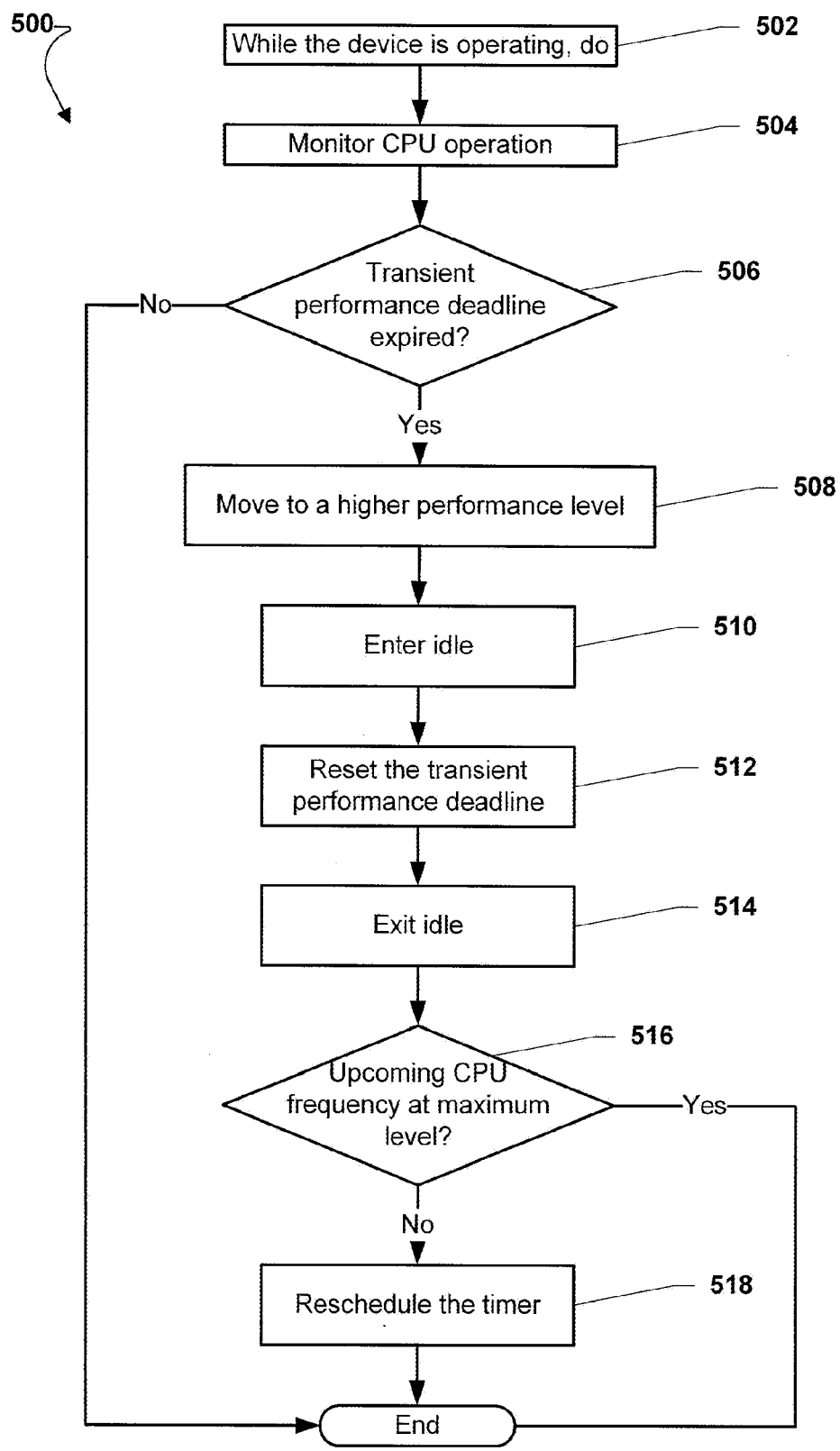
FIG. 5 is a flowchart illustrating a first aspect of a method of dynamically controlling power within a CPU.

Referring to FIG. 5, a first aspect of a method of dynamically controlling the power of a central processing unit is shown and is generally designated 500. The method 500 may commence at block 502 with a do loop in which when device is powered on, the following steps may be performed.

At block 504, a power controller, e.g., a dynamic clock and voltage scaling (DCVS) algorithm, may monitor one or more CPUs. At decision 506, the power controller may determine whether a transient performance deadline for a CPU has expired. If not, the method 500 may end. Otherwise, if the transient performance deadline has expired, the method 500 may proceed to block 508 and the power controller may move the CPU to a higher performance level, i.e., a next higher operating frequency. In one aspect, the controller may move the CPU to a maximum performance level, i.e., a maximum CPU frequency. However, in another aspect, the CPU may not jump to a maximum performance level. The CPU may jump to an intermediate level and then, jump again, either to the maximum level or another higher performance level. The number of intermediate jumps may and the amount of time between jumps may be used to determine the frequency value of the jump.

At block 510, the CPU may enter an idle condition. Further, at block 512, the transient performance deadline may be reset. At block 514, the CPU may exit the idle condition. Moving to decision 516, the power controller may determine whether the upcoming CPU frequency is at a maximum CPU frequency. If so, the method 500 may end. Otherwise, if the CPU frequency is not at the maximum CPU frequency, the method may proceed to block 518 and the timer may be rescheduled. Then, the method 500 may end.

Figure 6:
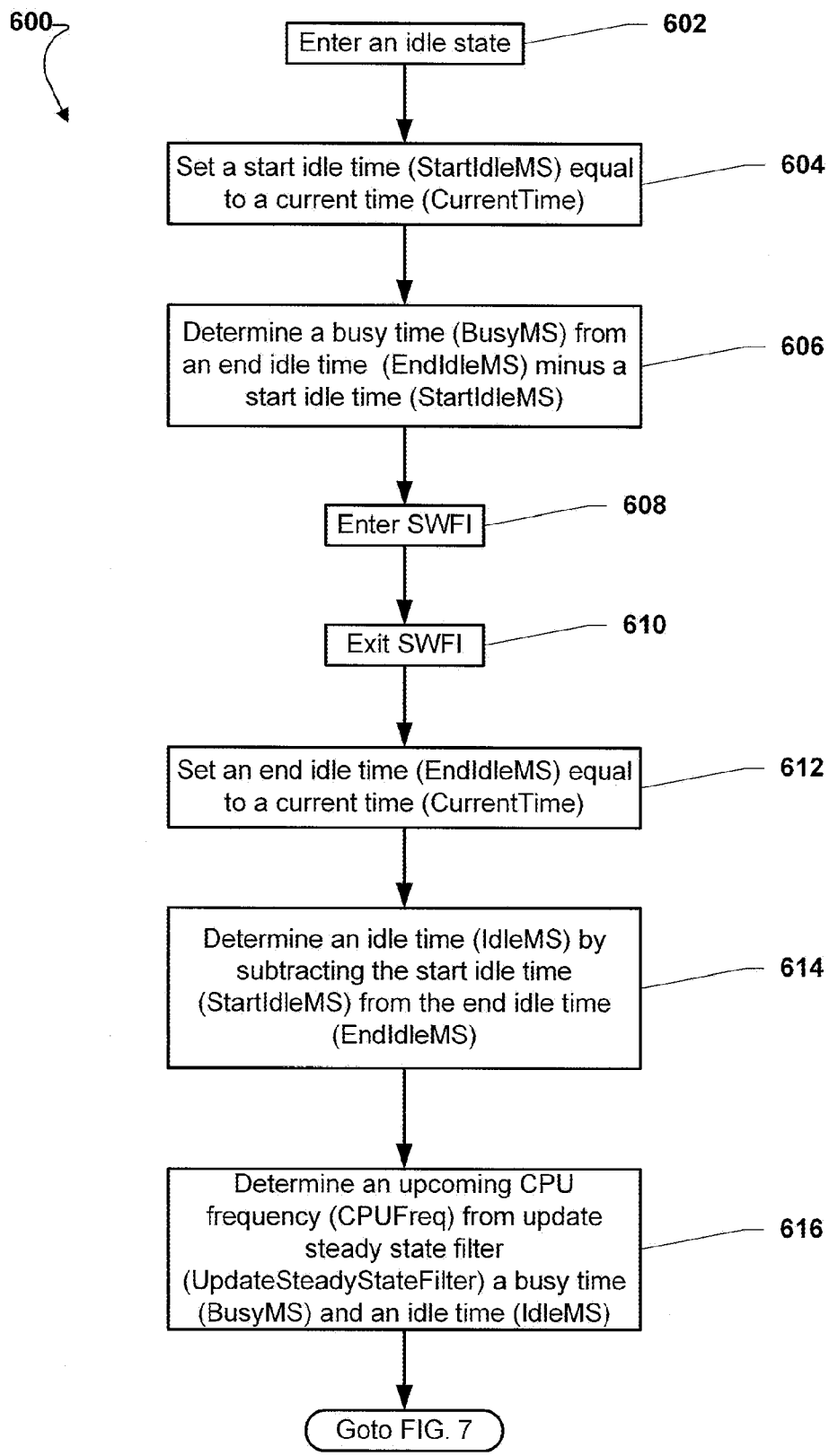
FIG. 6 is a flowchart illustrating a first portion of a second aspect of a method of dynamically controlling power within a CPU.

Referring to FIG. 6, a second aspect of a method of dynamically controlling the power of a central processing unit is shown and is generally designated 600. Beginning at block 602, a central processing unit (CPU) may enter an idle state. At block 604, a power controller, e.g., a dynamic clock and voltage scaling (DCVS) algorithm, may set a start idle time (StartIdleTime) equal to a current time (CurrentTime). Further, at block 606, the power controller may determine a busy time (BusyTime) by subtracting a start idle time (StartIdleTime) from an end idle time (EndIdleTime).

At block 608, the CPU may enter a software wait for interrupt (SWFI) condition. At block 610, the CPU may exit the SWFI condition. Moving to block 612, the power controller may set an end idle time (EndIdleTime) equal to a current time (CurrentTime). Further, at block 614, the power controller may determine an idle time (IdleTime) by subtracting the start idle time (StartIdleTime) from the end idle time (EndIdleTime). At block 616, the power controller may determine an upcoming CPU frequency (CPUFreq) from an updated steady state filter (UpdateSteadyStateFilter) a busy time (BusyTime) and an idle time (IdleTime). Thereafter, the method 600 may continue to block 702 of FIG. 7.

At block 702, the power controller may determine an effective transient budget (EffectiveTransientBudget) using the following formula:

$$\text{EffectiveTransientBudget} = (\text{TransientResponseDeadline} * \text{NextCPUFreq}) / (\text{NextCPUFreq} - \text{CPUFreq})$$

where,

TransientResponseDeadline=A transient response deadline, i.e., slack budget,

NextCPUFreq=A next CPU frequency that is one frequency step higher than an upcoming CPU frequency, and CPUFreq=An upcoming CPU frequency (CPUFreq).

In a particular aspect, a clock scheduling overhead (ClockSchedulingOverhead) and a clock switch overhead (ClockSwitchOverhead) may also be added to the EffectiveTransientBudget. Further, a voltage change overhead (VoltageChangeOverhead) may be added to the EffectiveTransientBudget. Moving to block 704, the power controller may set a deadline to jump to a higher frequency (SetJumpToFrequency) equal to the end idle time (EndIdleTime) plus the effective transient budget (EffectiveTransientBudget). In another aspect, the deadline to jump may be the current time plus the transient budget. Thereafter, the method 600 may end.

Figure 7:
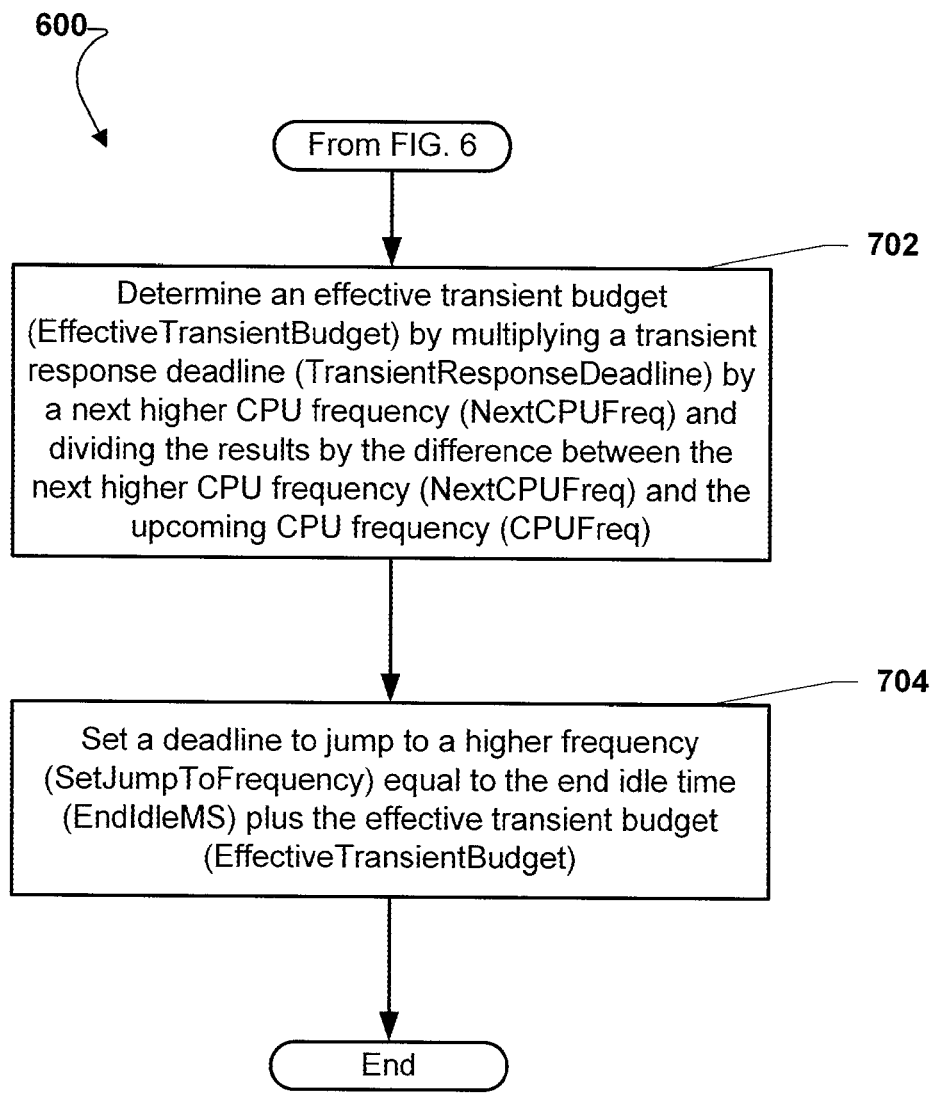
FIG. 7 is a flowchart illustrating a second portion of the second aspect of a method of dynamically controlling power within a multicore CPU.

In a particular aspect, the method 600 described in conjunction with FIG. 6 and FIG. 7 may be used to calculate the amount of time that the CPU may remain at the frequency determined by the DCVS before the transient deadline is exhausted and schedule a jump to the higher CPU frequency by that amount of time in the future. If idle is reentered prior to the jump to the higher frequency, the scheduled jump may be cancelled. The method 600 may delay the jump to the higher frequency by the amount of time determined as the EffectiveTransientBudget.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

In a particular aspect, a DCVS algorithm is a mechanism which measures CPU load/idle time and dynamically adjusts the CPU clock frequency to track the workload in an effort to reduce power consumption while still providing satisfactory system performance. As the workload changes, the change in CPU throughput may track, but also necessarily lag, the changes in the workload. Unfortunately, this may introduce a problem in cases where the workload has Quality of Service (QoS) requirements, as the DCVS algorithm may not track the workload quickly enough. Further, tasks may fail.

Many DCVS techniques involve measuring the steady state performance requirements of the CPU and setting the CPU frequency and voltage to the lowest level that may meet the steady state CPU usage. This is typically done by measuring the CPU utilization (percentage busy) over a period of time and setting the CPU performance level to one in which the average CPU utilization falls between a high and low threshold. The averaging period is optimized to minimize the frequency of changing clock frequencies, while maintaining reasonable responsiveness. In order to respond to transient workloads and/or the start of new workloads panic inputs may have been utilized to quickly bring up the CPU frequency.

In order to avoid the problem of the DCVS lagging the workload and causing tasks to fail, the system and methods disclosed herein provide a transient performance guarantee. The transient performance guarantee may be defined as the maximum amount of time that a continuously busy pulse may be delayed, as compared to running at the higher performance level. This may be accomplished by getting to the higher performance level prior to the transient performance deadline expiring and resetting the deadline whenever we go idle, since if the CPU is idle, it is by definition not in an oversubscribed state. As disclosed herein, the timer may be rescheduled to preserve the QoS guarantee whenever the system comes out of idle and the system CPU is not running at the maximum frequency.

Figure 8:
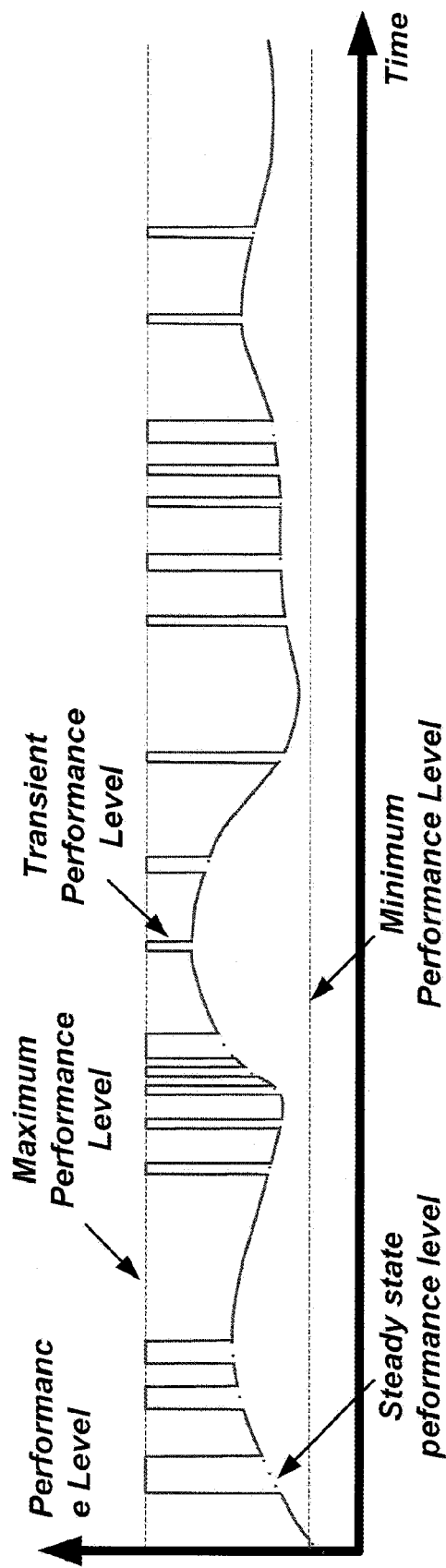
FIG. 8 is an exemplary graph showing the dynamic clock and voltage scaling (DCVS) controlled CPU frequency plotted over time.

In order to minimize the power impact of the transient performance guarantee, the present system and methods minimize the likely hood that an incoming pulse may require a frequency increase in order to meet the deadline. This may be accomplished by delaying the frequency, i.e., performance level, change until the effective transient budget has been exhausted and then, jumping straight to the higher performance level and staying there until the pulse is complete as shown in FIG. 8.

Figure 9:
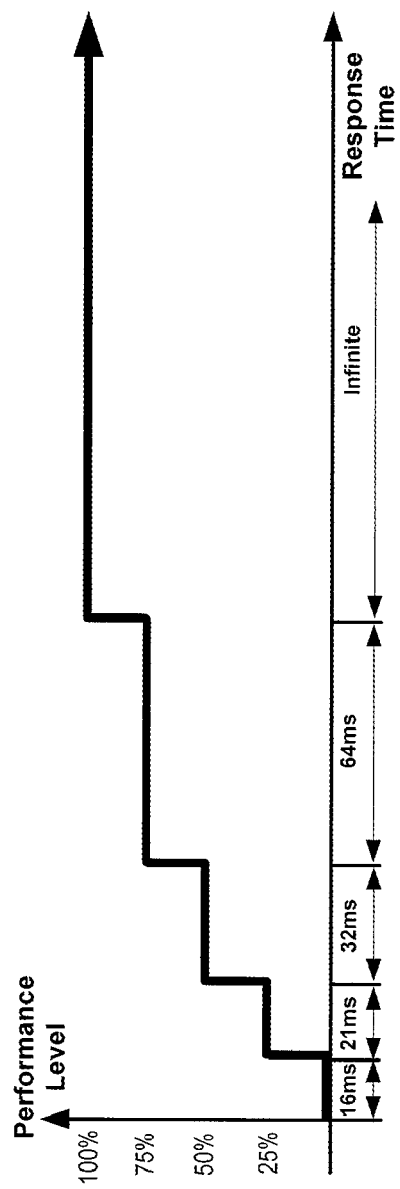
FIG. 9 is an exemplary graph showing effective transient response times for various performance levels.

In a particular aspect, the effective transient budget is calculated as the transient response deadline scaled to the current performance level. For example, if the CPU is running a 75% of the maximum clock rate and the transient response deadline is 16 ms, the effective transient budget is 64 ms, i.e., 16 ms/(1-0.75). The effective transient budget represents how long the CPU may run at the current performance level prior to exhausting the budget. If the CPU is idle, the effective transient budget may be the same as the transient response deadline. If we are at the maximum performance level, the effective transient budget is infinite as shown in FIG. 9.

Using the methods described herein, the system may provide a strict bound on the maximum amount of time a task might run at some level other than the maximum level, and therefore implicitly provide a calculable bound on completion for tasks that require QoS guarantees, while still allowing dynamic CPU clock scaling. The bound may be set based on what tasks are currently running, a global system property, DCVS algorithm design or other properties, and may be entirely disabled if the system is not running any tasks that have QoS requirements or if the CPU is running at max clock.

In a particular aspect, the present methods may be extended by, instead of jumping to the maximum frequency when the deadline has expired, setting shorter internal effective deadlines and jumping to one, or more, intermediate frequencies, while still ensuring that the CPU is at the maximum frequency before the maximum QoS delay has been exhausted. Further, the present methods may substantially ensure that a well defined transient QoS is maintained, while simultaneously reducing overall CPU power.

The system and methods described herein may utilize opportunistic sampling. In other words, the system and methods may check for timer expiration on a periodic basis. In other aspects, the system and methods may not utilize opportunistic sampling.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

Although selected aspects have been illustrated and described in detail, it will be understood that various substitutions and alterations may be made therein without departing from the spirit and scope of the present invention, as defined by the following claims.

What is claimed is:

1. A method of controlling power at a central processing unit (CPU) of a portable computing device, the method comprising:
   determining a first time value by computing an amount of time required to perform tasks scheduled for execution in the CPU;
   determining a second time value by computing an amount of time that the CPU may remain in a busy state after the first time value without impacting a responsiveness of the portable computing device;
   computing a transient performance deadline as a sum of the first and second time values;
   commencing the performance of the scheduled tasks and a transient workload by the CPU;
   determining whether the transient performance deadline for the CPU has expired;
   moving to a higher CPU frequency level in response to determining that the transient performance deadline has expired and prior to the CPU entering an idle state;
   entering the idle state; and
   resetting the transient performance deadline based on an effective transient budget while in the idle state.

2. The method of claim 1, further comprising:
   exiting the idle state.

3. The method of claim 2, further comprising:
   determining whether the CPU frequency has increased to a maximum CPU frequency.

4. The method of claim 3, further comprising:
   rescheduling a timer in response to determining that the CPU frequency has not increased to a maximum CPU frequency.

5. The method of claim 1, further comprising:
   determining an upcoming CPU frequency level for an upcoming busy cycle.

6. The method of claim 5, further comprising:
   determining the effective transient budget by multiplying the transient performance deadline by a next higher CPU frequency level and dividing a result by a difference between the next higher CPU frequency level and the upcoming CPU frequency level, wherein the next higher CPU frequency level is one level higher than the upcoming CPU frequency level.

7. The method of claim 6, further comprising:
adding an overhead to the effective transient budget.

8. The method of claim 7, wherein adding an overhead to the effective transient budget comprises adding a clock switch overhead, a clock scheduling overhead, a voltage change overhead, or a combination thereof.

9. The method of claim 8, wherein resetting the transient performance deadline based on an effective transient budget while in the idle state comprises setting the transient performance deadline equal to an end idle time plus the effective transient budget and the overhead.

10. The method of claim 8, wherein resetting the transient performance deadline based on an effective transient budget while in the idle state comprises setting the transient performance deadline equal to a current time plus the effective transient budget and the overhead.

11. A portable computing device, comprising:
means for determining a first time value comprising means for computing an amount of time required to perform tasks scheduled for execution in a central processing unit (CPU) of the portable computing device;
means for determining a second time value comprising means for computing an amount of time that the CPU may remain in a busy state after the first time value without impacting a responsiveness of the portable computing device;
means for computing a transient performance deadline as a sum of the first and second time values;
means for commencing the performance of the scheduled tasks and a transient workload by the CPU;
means for determining whether the transient performance deadline has expired;
means for causing the CPU to move to a higher CPU frequency level in response to determining that the transient performance deadline has expired and prior to the CPU entering an idle state;
means for causing the CPU to enter the idle state; and
means for resetting the transient performance deadline based on an effective transient budget while the CPU is in the idle state.

12. The portable computing device of claim 11, further comprising:
means for causing the CPU to exit the idle state.

13. The portable computing device of claim 12, further comprising:
means for determining whether a CPU frequency has increased to a maximum CPU frequency.

14. The portable computing device of claim 13, further comprising:
means for rescheduling a timer in response to determining that the CPU frequency has not increased to a maximum CPU frequency.

15. The portable computing device of claim 11, further comprising:
means for determining an upcoming CPU frequency level for an upcoming busy cycle.

16. The portable computing device of claim 15, further comprising means for determining the effective transient budget by multiplying the transient performance deadline by a next higher CPU frequency level and dividing a result by a difference between the next higher CPU frequency level and the upcoming CPU frequency level, wherein the next higher CPU frequency level is one level higher than the upcoming CPU frequency level.

17. The portable computing device of claim 16, further comprising:
means for adding an overhead to the effective transient budget.

18. The portable computing device of claim 17, wherein means for adding an overhead to the effective transient budget comprises means for adding a clock switch overhead, a clock scheduling overhead, a voltage change overhead, or a combination thereof.

19. The portable computing device of claim 18, wherein means for resetting the transient performance deadline based on an effective transient budget while in the idle state comprises means for setting the transient performance deadline equal to an end idle time plus the effective transient budget and the overhead.

20. The portable computing device of claim 18, wherein means for resetting the transient performance deadline based on an effective transient budget while in the idle state comprises means for setting the transient performance deadline equal to a current time plus the effective transient budget and the overhead.

21. A computing device, comprising:
a memory; and
a processor coupled to the memory, wherein the processor is configured with processor executable instructions to perform operations comprising:
determining a first time value by computing an amount of time required to perform tasks scheduled for execution in the processor;
determining a second time value by computing an amount of time that the processor may remain in a busy state after the first time value without impacting a responsiveness of the computing device;
computing a transient performance deadline as a sum of the first and second time values;
commencing the performance of the scheduled tasks and a transient workload;
determining whether the transient performance deadline has expired;
moving to a higher processor frequency level in response to determining that the transient performance deadline has expired and prior to entering an idle state;
entering the idle state; and
resetting the transient performance deadline based on an effective transient budget while in the idle state.

22. The computing device of claim 21, wherein the processor is configured with processor-executable instructions to perform operations further comprising:
exiting the idle state.

23. The computing device of claim 22, wherein the processor is configured with processor-executable instructions to perform operations further comprising:
determining whether a processor frequency has increased to a maximum processor frequency.

24. The computing device of claim 23, wherein the processor is configured with processor-executable instructions to perform operations further comprising:
rescheduling a timer in response to determining that the processor frequency has not increased to a maximum processor frequency.

25. The computing device of claim 21, wherein the processor is configured with processor-executable instructions to perform operations further comprising:
determining an upcoming processor frequency level for an upcoming busy cycle.

26. The computing device of claim 25, wherein the processor is configured with processor-executable instructions to perform operations such that the effective transient budget is determined by multiplying the transient performance deadline by a next higher processor frequency level and dividing a result by a difference between the next higher processor frequency level and the upcoming frequency level, wherein the next higher processor frequency level is one level higher than the upcoming processor frequency level.

27. The computing device of claim 26, wherein the processor is configured with processor-executable instructions to perform operations further comprising:

adding an overhead to the effective transient budget.

28. The computing device of claim 27, wherein the processor is configured with processor-executable instructions to perform operations such that adding the overhead comprises adding a clock switch overhead, a clock scheduling overhead, a voltage change overhead, or a combination thereof.

29. The computing device of claim 28, wherein the processor is configured with processor-executable instructions to perform operations such that resetting the transient performance deadline based on the effective transient budget while in the idle state comprises setting the transient performance deadline equal to an end idle time plus the effective transient budget and the overhead.

30. The computing device of claim 28, wherein the processor is configured with processor-executable instructions to perform operations such that resetting the transient performance deadline based on the effective transient budget while in the idle state comprises setting the transient performance deadline equal to a current time plus the effective transient budget and the overhead.

31. A non-transitory computer-readable storage medium having stored thereon computer-executable instructions configured to cause a processor to perform operations comprising:

determining a first time value by computing an amount of time required to perform tasks scheduled for execution in a central processing unit (CPU) of a computing device;

determining a second time value by computing an amount of time that the CPU may remain in a busy state after the first time value without impacting a responsiveness of the computing device;

computing a transient performance deadline as a sum of the first and second time values;

commencing the performance of the scheduled tasks and a transient workload in the CPU;

determining whether the transient performance deadline for the CPU has expired;

moving to a higher CPU frequency level in response to determining that the transient performance deadline has expired and prior to the CPU entering an idle state;

entering the idle state; and resetting the transient performance deadline based on an effective transient budget while in the idle state.

32. The non-transitory computer-readable storage medium of claim 31, wherein the stored computer-executable instructions are configured to cause the processor to perform operations further comprising:

exiting the idle state.

33. The non-transitory computer-readable storage medium of claim 32, wherein the stored computer-executable instructions are configured to cause the processor to perform operations further comprising:

determining whether a CPU frequency has increased to a maximum CPU frequency.

34. The non-transitory computer-readable storage medium of claim 33, wherein the stored computer-executable instructions are configured to cause the processor to perform operations further comprising:

rescheduling a timer in response to determining that the CPU frequency has not increased to a maximum CPU frequency.

35. The non-transitory computer-readable storage medium of claim 31, wherein the stored computer-executable instructions are configured to cause the processor to perform operations further comprising:

determining an upcoming CPU frequency level for an upcoming busy cycle.

36. The non-transitory computer-readable storage medium of claim 35, wherein the stored computer-executable instructions are configured to cause the processor to perform operations such that the effective transient budget is determined by multiplying the transient performance deadline by a next higher CPU frequency level and dividing a result by a difference between the next higher CPU frequency level and the upcoming CPU frequency level, wherein the next higher CPU frequency level is one level higher than the upcoming CPU frequency level.

37. The non-transitory computer-readable storage medium of claim 36, wherein the stored computer-executable instructions are configured to cause the processor to perform operations further comprising:

adding an overhead to the effective transient budget.

38. The non-transitory computer-readable storage medium of claim 37, wherein the stored computer-executable instructions are configured to cause the processor to perform operations such that adding the overhead comprises adding a clock switch overhead, a clock scheduling overhead, a voltage change overhead, or a combination thereof.

39. The non-transitory computer-readable storage medium of claim 38, wherein the stored computer-executable instructions are configured to cause the processor to perform operations such that resetting the transient performance deadline based on the effective transient budget comprises setting the transient performance deadline equal to an end idle time plus the effective transient budget and the overhead.

40. The non-transitory computer-readable storage medium of claim 38, wherein the stored computer-executable instructions are configured to cause the processor to perform operations such that resetting the transient performance deadline based on the effective transient budget comprises setting the transient performance deadline equal to a current time plus the effective transient budget and the overhead.

* * * * *